(12) United States Patent
Greene et al.

(10) Patent No.: US 7,426,859 B2
(45) Date of Patent: Sep. 23, 2008

(54) MOTION SENSOR AND METHOD FOR DETECTING MOTION

(75) Inventors: Michael E. Greene, Opelika, AL (US); Victor S. Trent, Auburn, AL (US)

(73) Assignee: Archangel Systems, Inc., Auburn, AL (US)

(*) Notice: Subject to any disclaimer, the term of this patent is extended or adjusted under 35 U.S.C. 154(b) by 194 days.

(21) Appl. No.: 10/976,459

(22) Filed: Oct. 29, 2004

(65) Prior Publication Data

US 2006/0090564 A1    May 4, 2006

(51) Int. Cl.
*G01C 19/00* (2006.01)
(52) U.S. Cl. .................................. 73/504.02
(58) Field of Classification Search ........... 73/504.02, 73/504.03, 504.07, 514.16, 514.17, 514.18, 73/514.39, 514.32; 438/379; 702/141
See application file for complete search history.

(56) References Cited

U.S. PATENT DOCUMENTS

| | | | | |
|---|---|---|---|---|
| 1,368,037 | A * | 2/1921 | Thomas | 24/166 |
| 3,548,507 | A * | 12/1970 | Mueller | 33/322 |
| 6,443,008 | B1 | 9/2002 | Funk et al. | 73/504.12 |
| 6,668,648 | B2 | 12/2003 | Karasawa et al. | 73/504.08 |
| 6,788,220 | B2 * | 9/2004 | Netzer | 340/870.37 |
| 6,856,067 | B2 * | 2/2005 | Frey et al. | 310/309 |
| 2004/0163471 | A1 * | 8/2004 | Frey et al. | 73/514.18 |
| 2004/0252032 | A1 * | 12/2004 | Netzer | 340/870.37 |
| 2005/0241394 | A1 * | 11/2005 | Clark | 73/504.12 |

FOREIGN PATENT DOCUMENTS

WO    WO96/31941    10/2006

OTHER PUBLICATIONS

Frechette, et al., An Electrostatic Induction Micromotor Supported on Gas-lubricated Bearings, IEEE $14^{14}$, International Micro Electro Mech. Systems Conf., MEMS, pp. 1-4, 2001.
Fax, The Electrostatically Suspended Gyroscope as Accelerometer: Modeling, Evaluation and Experiment, Engineering and Applied Science, California Institute of Technology, Jun. 12, 1998.
Gindila et al., Electro Interface design for an electrically floating micro-disc, J. Micromech. Microeng. 13, pp. S11-S16, 2003.
Houlihan et al., Modelling of an accelerometer based on a levitated proof mass, J. Micromech. Microeng., 12, pp. 1-8, 2002.

(Continued)

*Primary Examiner*—Hezron E. Williams
*Assistant Examiner*—Tamiko D Bellamy
(74) *Attorney, Agent, or Firm*—Wolf, Greenfield & Sacks, P.C.

(57) ABSTRACT

A motion sensor may detect linear and/or angular acceleration and/or angular velocity of a body relative to one axis, two orthogonal axes or three orthogonal axes. Movement of the body or reference structure may be detected relative to one or more spinning rotors. The rotor(s) may be suspended for rotation and/or other movement relative to the reference structure without physical contacting the reference structure. In one embodiment, the rotor(s) may be electrostatically suspended in such a way that movement of the rotor(s) relative to the reference structure may be detected.

42 Claims, 3 Drawing Sheets

OTHER PUBLICATIONS

Kraft, Micromachined Inertial Sensors State of the Art and a Look into the Future, IMC Measurement and Control, vol. 33, No. 6, pp. 164-168, 2000.

Kraft, et al., Modeling and Design of an Electrostatically Levitated Disk for Inertial Sensing Applications, Proc. Conf. on Micromechanics Europe, Paper C12, Stockholm, 2000.

Warnasch et al., Low Cost, High Accuracy, Micro Electro-Mechanical Systems (MEMS), Intertial Measurements Unit (IMU) Program, IEEE Plans, Position Location and Navigation Symposium, pp. 299-302, 2002.

International Search Report and Written Opinion PCT/US2005/039416 dated Jan. 9, 2007.

* cited by examiner

MOTION SENSOR AND METHOD FOR DETECTING MOTION

Aspects of the invention were made with Government support under Contract Nos. N00178-02-C-1043, N00178-03-C-1059 awarded by the Missile Defense Agency (MDA) and awarded by the Navy. The Government may retain certain rights in this invention.

BACKGROUND OF INVENTION

This invention relates to detecting motion, and particularly to a gyroscopic-type device that can be used to detect acceleration and/or speed of motion of a body.

Small, high accuracy, robust attitude solutions are highly sought after in many military and commercial applications. Military entities, in particular, are interested in an accurate, shock/vibration resistant sensor for use in missiles, projectiles, etc. that measure body accelerations and angular rotation rates. Commercial entities are interested in small, low cost, accurate attitude solutions for various purposes, such as in automobile and other vehicle sensing systems. Low cost sensor packages using Micro-Electro-Mechanical Systems (MEMS) sensors have not provided the accuracy necessary for at least some of these applications.

SUMMARY OF INVENTION

Aspects of the invention provide a motion sensor that can detect movement of a body. Aspects of such movement that may be detected include linear and/or angular acceleration and/or angular velocity relative to one axis, two orthogonal axes or three orthogonal axes. In one aspect of the invention, movement of a body or reference structure may be detected relative to one or more spinning rotors. The rotor(s) may be suspended for rotation and/or other movement relative to the reference structure without physically contacting the reference structure. For example, the rotor(s) may be electrostatically suspended in a space in such a way that movement of the rotor(s) in the space relative to the reference structure may be detected without physical contact with the rotor(s). In one aspect of the invention, an electrical charge may be injected or otherwise placed onto the rotor(s), and a capacitance between the rotor(s) and one or more electrodes on the reference structure may be detected. Such capacitance may indicate the position of the rotor(s) relative to the electrodes, and therefore relative to the reference structure. A controller may apply electrostatic or other forces to the rotor to maintain the rotor in a desired location relative to the reference structure, and use the magnitude and direction of the forces to determine movement of the reference structure. For example, a controller may use the magnitude and direction of the forces to determine an acceleration and/or a rotational speed of the reference structure relative to the rotor(s), and therefore relative to a more global reference, such as the earth. As used in the claims, a "force" refers to a linear force and/or a rotational force (or moment).

In one aspect of the invention, a motion sensor includes a reference structure, and at least two free-floating rotors each constructed and arranged to rotate about an axis relative to the reference structure. The rotors are arranged to be free from contact with the reference structure, and may rotate in opposite directions about parallel axes. Circuitry detects movement of the reference structure relative to the free-floating rotors, e.g., based on detected movement of the free-floating rotor(s). The circuitry may detect linear or rotational movement of the reference structure relative to at least one axis, relative to two orthogonal axes or relative to three orthogonal axes. In another embodiment, the circuitry may detect a speed of rotational movement of the reference structure and/or linear or rotational acceleration of the reference structure relative to at least one axis, relative to two orthogonal axes or relative to three orthogonal axes. The circuitry may exert one or more electrostatic forces on the free-floating rotors to maintain the free-floating rotors in a desired position relative to the reference structure. In one embodiment, the circuitry may determine the electrostatic forces required to maintain the rotors in a desired position based on a capacitance between at least one electrode and the free-floating rotors. An acceleration and/or rotational movement of the reference structure may be determined based on the electrostatic forces exerted on the free-floating rotors.

In another illustrative embodiment, a motion sensor may include a reference structure, at least one gyroscopic rotor arranged to rotate about an axis relative to the reference structure without physical contact with a support, and a controller that detects movement of the gyroscopic rotor relative to the reference structure. In one embodiment, the controller may apply at least one force to the gyroscopic rotor to urge the gyroscopic rotor to a desired position relative to the reference structure and detect movement of the reference structure relative to the gyroscopic rotor based on the at least one force applied to the gyroscopic rotor. In one illustrative embodiment, the motion sensor includes a first stator and a second stator arranged so that the gyroscopic rotor is positioned between the first and second stators. Each stator may include four or more electrodes, and a set of lateral electrodes may be positioned around a periphery of the gyroscopic rotor. Electrical signals may be applied to the first and second stators and the lateral electrodes to maintain the rotor in a desired position relative to the reference structure. A set of drive electrodes may drive the gyroscopic rotor to rotate.

In another illustrative embodiment, a motion sensor may include a reference structure, a gyroscopic rotor arranged to rotate about an axis relative to the reference structure, and a controller that determines a linear acceleration of the reference structure along at least one axis based on movement of the gyroscopic rotor relative to the reference structure.

In another aspect of the invention, a method of sensing movement of a device includes rotating a free-floating body relative to a reference structure, detecting movement of the free-floating body relative to the reference structure, and determining an acceleration of the reference structure based on the detected movement of the free-floating body relative to the reference structure. Detecting movement of the reference structure may be performed by detecting a change in capacitance between the free-floating body and at least a portion of the reference structure. At least one force may be exerted on the free-floating body to urge the free-floating body to move to a desired position relative to the reference structure, and an acceleration of the reference structure may be determined based on the at least one force.

These and other aspects of the invention will be apparent and/or obvious from the following detailed description and the appended claims.

BRIEF DESCRIPTION OF THE DRAWINGS

Aspects of the invention are described below with reference to the following drawings in which like numerals reference like elements, and wherein.

DETAILED DESCRIPTION

Various aspects of the invention are described below with reference to illustrative embodiments. However, it should be understood that aspects of the invention are not limited to those embodiments described below, but instead may be used in any suitable system or arrangement. For example, an illustrative embodiment is described below in which a pair of counter-rotating rotors is used to detect movement. However, it should be understood that only a single rotor may be used, that two or more rotors may be used that rotate about non-parallel axes, etc.

Figure 1:
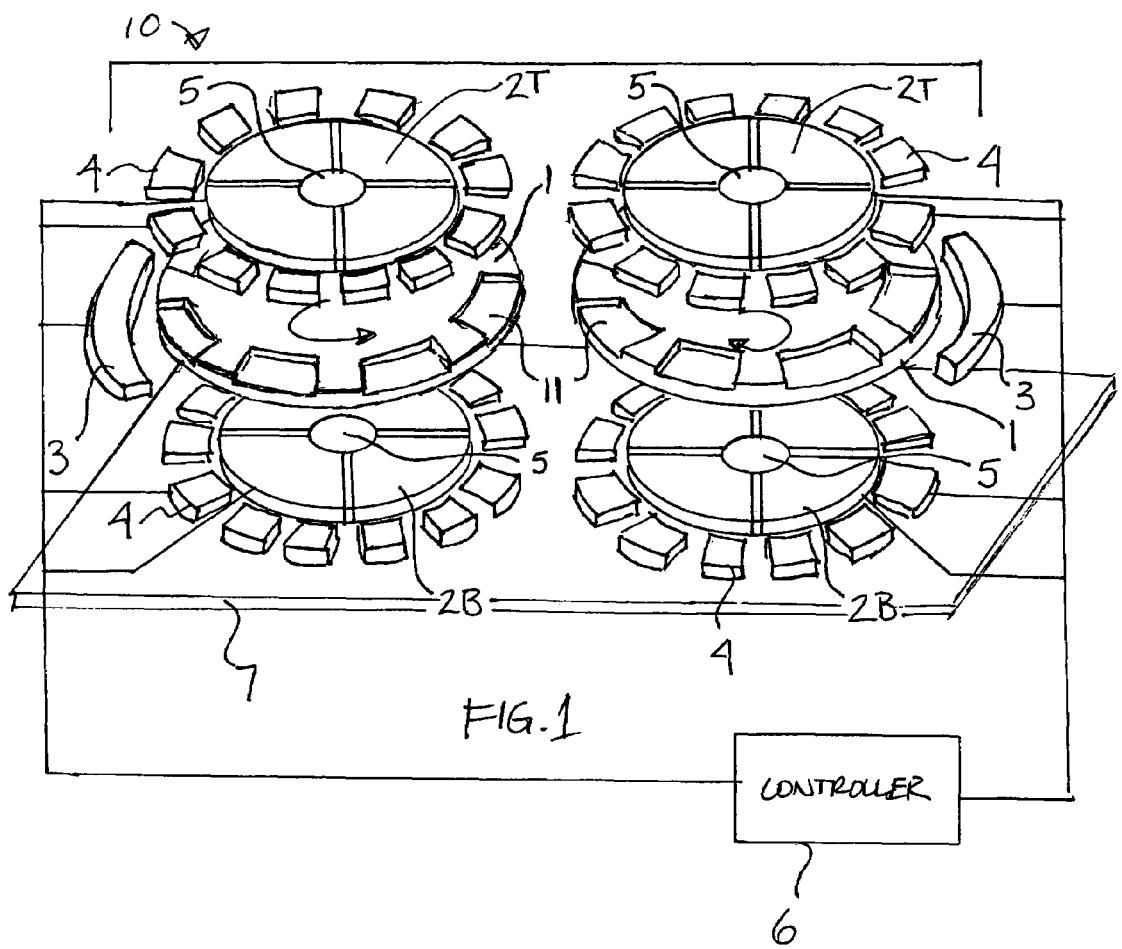
FIG. 1 shows a perspective view of an illustrative motion sensor having a pair of gyroscopic rotors.

FIG. 1 shows an illustrative embodiment of a motion sensor 10 in accordance with aspects of the invention. One or more rotors 1 may be arranged to rotate about an axis relative to stators 2 and lateral electrodes 3 without contact with any physical support. In this illustrative embodiment, two rotors 1 are arranged to rotate in opposite directions (i.e., counter-rotate) about parallel axes oriented in the z-direction in a free-floating manner. The stators 2 and lateral electrodes 3 may be part of, or be fixed to, a reference structure 7, such as a frame, carrier, substrate or other support for the motion sensor 10. Although FIG. 1 shows only a portion of the reference structure 7, it should be understood that the reference structure 7 may be formed in any suitable way, e.g., in the form of a box-like structure that supports the stators 2, lateral electrodes 3 and other portions of the motion sensor 10 and provides a cavity to house the rotors.

Movement of the rotors 1 relative to the reference structure may be detected by a controller 6. As will be understood by those of skill in the art, movement of the rotors 1 relative to the reference structure may be indicative of movement of the reference structure relative to a global reference, such as the earth. That is, the free-floating rotors will tend to stay at rest or move in a constant way relative to a global reference in the absence of a force acting on the rotors. Since the rotors are free-floating, movement of the reference structure relative to the global reference causes the reference structure to move relative to the free-floating rotors (which, depending on the frame of reference, appears as movement of the rotors relative to the reference structure). Based on detected movement of the rotors 1 relative to the reference structure 7, the controller 6 can determine a linear and/or angular acceleration and/or rotational velocity of the reference structure (relative to a global reference). In this illustrative embodiment, the controller 6 can determine a linear acceleration of the reference structure 7 along three orthogonal axes (i.e., linear acceleration along the x, y, and z directions). However, it should be understood that the controller 6 may determine linear and/or angular acceleration and/or rotational velocity of the reference structure relative to one axis only, or two orthogonal axes only. Moreover, acceleration and/or rotational velocity may be determined along any suitable axis or axes, not necessarily an axis arranged in any particular direction, e.g., in directions other than perpendicular to the rotation axis of the rotor 1, or axes that are not orthogonal. Also, linear velocities of the reference structure 7 relative to one, two or three axes may be calculated, in some cases based on known initial conditions (e.g., known initial velocity of the reference structure relative to a global reference).

The controller 6 may detect movement of the rotors 1 relative to the reference structure in any suitable way. In this illustrative embodiment, the controller 6 detects the position of the rotors 1 relative to the reference structure by detecting changes in capacitance between a portion or portions of the stators 2 and a rotor 1 and/or between one or more lateral electrodes 3 and the rotor 1, and/or between one or more sense electrodes 5 and the rotor 1. As will be understood by those of skill in the art, the capacitance between charged members varies based on the distance between the members. Therefore, a detected change in capacitance between a rotor 1 and one or more electrodes (e.g., in the stators 2, lateral electrodes 3 or sense electrodes 5) indicates a change in position of the rotor 1 relative to the reference structure. The rotor 1, which may have a conductive surface and/or be formed of a conductive material, may have a suitable electrical charge placed on it at the time of sensor start up and/or during sensor operation. The charge on the rotor may be injected directly onto the rotor using a field emission or other suitable technique. Charge on the stators 2, lateral electrodes 3 and sense electrodes 5 may be controlled by the controller 6.

Based on the detected capacitance changes, the controller 6 may apply a suitable electrical signal to the stators 2 and/or lateral electrodes 3 to urge the rotor 1 to move to a desired position relative to the reference structure. In one embodiment, these forces may keep the rotors 1 centered relative to the electrodes and prevent the rotors 1 from contacting the electrodes or other portions of the device. The electrical signal(s) may be a voltage and/or electrical charge applied to the stators 2 and/or lateral electrodes 3 to thereby apply a suitable electrostatic force to the rotor 1. Based on the electrical signal(s) applied by the controller 6 to the stators 2 and/or lateral electrodes 3, the controller 6 may determine the force(s) used to properly position the rotor 1, and from the force(s), determine the acceleration(s) of the reference structure. However, it should be appreciated that other force types may be used to control the rotor position, such as magnetic forces. For example, the rotor may include a permanent magnet or ferromagnetic materials, and electromagnetic coils in the stators may exert forces on the rotor to maintain its position.

The controller 6 may also determine the angular velocity of the reference structure based on the forces applied to the rotor 1. As is explained in more detail below, the angular velocity of the reference structure may be determined about one axis, or two orthogonal axes. Additionally, by detecting the rotational speed of the rotor 1, the controller 6 may determine the angular velocity of the reference structure about three orthogonal axes. The rotational speed of the rotor 1 may be detected by a set of drive electrodes 4 that also serve to drive the rotor 1 to rotate.

In the illustrative embodiment of FIG. 1, the motion sensor 10 has two (or more) rotors 1 which may counter-rotate relative to each other about parallel axes. By using such counter-rotating rotors 1, the motion sensor 10 may reduce its susceptibility to common mode effects, such as capacitance changes due to thermal expansion/contraction and noise. These common mode effects cancel each other out with the use of counter-rotating rotors, and thus may improve the accuracy of the motion sensor's ability to detect accelerations and/or angular velocities of the reference structure. Also, use of two or more rotors may enable the motion sensor to detect angular velocities that may not be detected using a single-rotor device. However, the motion sensor 10 could include only one rotor 1 in a device enabled to detect linear and/or angular accelerations.

Figure 2:
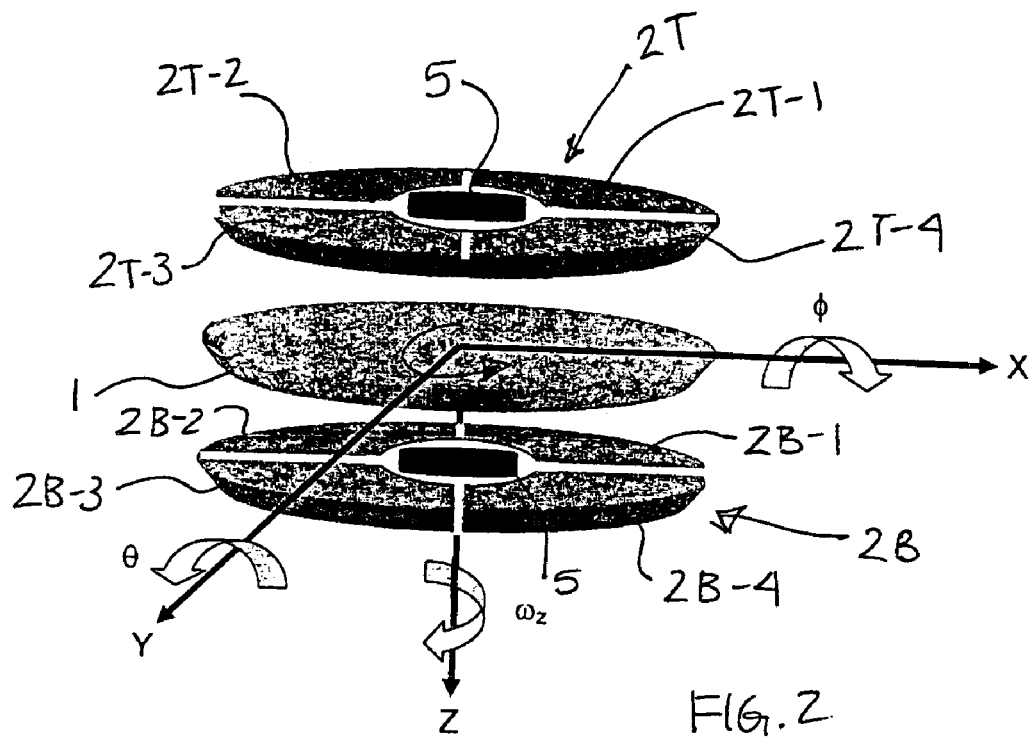
FIG. 2 shows a side view of a stator/rotor arrangement in an illustrative embodiment.

FIG. 2 shows a somewhat simplified side view of a rotor/stator arrangement used in the FIG. 1 device with the lateral electrodes 3 not shown. Each stator 2 includes four electrodes each and a sense electrode 5. For example, the top stator 2T includes electrodes 2T-1, 2T-2, 2T-3 and 2T-4. Although not necessary, in this illustrative embodiment, each of these electrodes is arranged to work together with a corresponding electrode in the bottom stator 2B. Thus, the electrode 2T-1 works together with the electrode 2B-1, electrode 2T-2 works with electrode 2B-2, and so on. The electrodes are coupled to the controller 6 so that the controller 6 may apply suitable electrical signals to the electrodes to maintain the rotor 1 in a desired position relative to the reference structure. Although other approaches are possible, in this illustrative embodiment, the controller applies an electrical signal, e.g., an amount of electric charge or a voltage, to the electrodes based on a capacitance detected between the electrodes and the rotor 1. As those of skill in the art will understand, the capacitance between an electrode and the rotor 1 will vary with the distance between the electrode and the rotor 1. Thus, the capacitance can indicate the position of the rotor 1 and be used to control the rotor position.

For example, the controller 6 may determine a difference in detected capacitance between electrode pairs, such as a difference between the capacitance of the electrode 2T-1 and the rotor 1, and the capacitance of the electrode 2B-1 and the rotor 1. Based on this difference, suitable electrical signals may be applied to the electrodes 2T-1 and 2B-1 to apply an electrostatic force on the rotor 1. (As discussed above, the rotor 1 carries an electrical charge, enabling the electrodes to apply an electrostatic force to the rotor 1.) The controller 6 may employ one or more bridge circuits that input the capacitance detected for electrode pairs, and output the difference in the capacitances, which may be amplified and used to generate the electrical signals applied to the electrodes. Thus, the controller may use a closed-loop, force-balanced control system to keep the rotor(s) 1 in a desired position, e.g., centered between opposing electrodes. The rotor position control may, of course, be implemented in other ways, such as with an open loop control system or other suitable arrangement. Moreover, movement of the rotor 1 may be detected in other ways, such as by laser interferometry or other suitable means.

In one illustrative embodiment, the electrodes in the stator 2 and/or lateral electrodes 3 may serve both sensing and rotor position control functions. For example, the electrodes in the stator 2 and/or lateral electrodes 3 may be switched (e.g., multiplexed) between a sense operation in which a capacitance between the electrodes and the rotor is detected, and a control operation in which control signals are applied to the electrodes to exert a force on the rotor. A modulated AC carrier signal (e.g., in the 40 kHz-100 MHz range) may be applied to each electrode during its sense operation, with complementary carrier signals being applied to working pairs of electrodes. Alternately, the motion sensor 10 may include electrodes that are dedicated to sense and control functions. For example, the electrodes in the stators 2 and the lateral electrodes 3 may function only to apply control forces to the rotor, whereas other electrodes, such as the sense electrode 5, may be dedicated to performing only a sensing function. In this illustrative embodiment, the sense electrode 5 may be used to detect the position of the center of the rotor 1 between the stators 2 and used to adjust the electrical signals applied to the stator electrodes.

Figure 3:
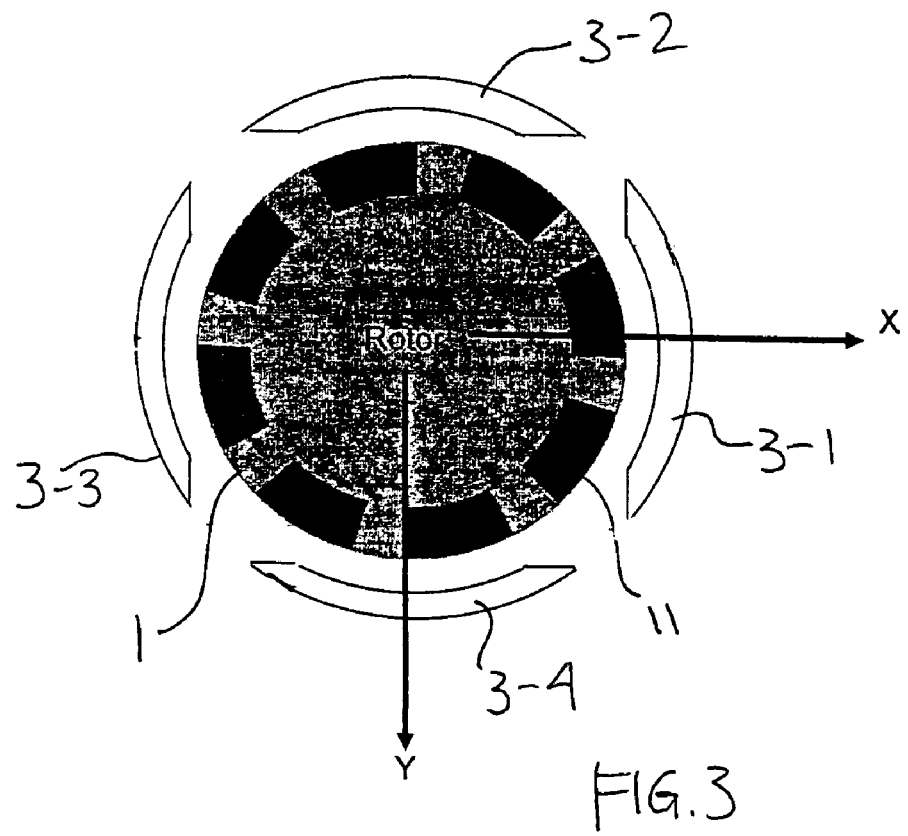
FIG. 3 shows a top view of a rotor and lateral electrodes in an illustrative embodiment.

FIG. 3 shows a top view of a rotor 1 and lateral electrodes 3 in the FIG. 1 arrangement. In this illustrative embodiment, there are four lateral electrodes arranged around the periphery of the rotor 1. The lateral electrodes 3 operate in a similar way to the electrodes in the stators 2. That is, the controller 6 may detect a capacitance between the lateral electrodes 3 and the rotor 1, and apply suitable electrical signals to the lateral electrodes 3 to maintain the rotor 1 appropriately positioned in the x- and y-directions. As in the stator electrodes, the difference in capacitance between opposed lateral electrode pairs, e.g., a difference in capacitance between the lateral electrode 3-1 and the rotor 1, and between the lateral electrode 3-3 and the rotor 1, may be used by the controller 6 to generate suitable electrical signals to be applied to the electrodes. Electrical charge or voltage applied to the lateral electrodes 3 may cause an electrostatic force to be exerted on the rotor 1.

Figures 4, 5:
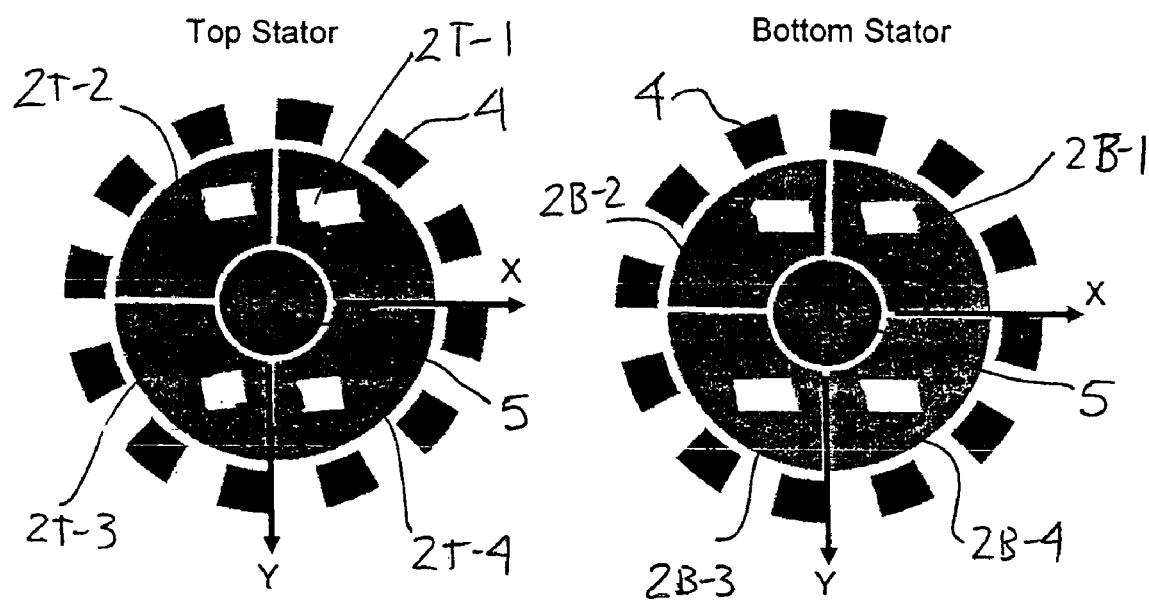
FIGS. 4 and 5 show top views of the top and bottom stators and drive electrode sets in an illustrative embodiment.

FIGS. 4 and 5 show top views of the top and bottom stators 2T and 2B, respectively. Twelve drive electrodes 4 are positioned around the periphery of the stators 2, and are arranged to cause the rotor 1 to rotate when appropriate electrical signals are applied to the drive electrodes 4 by the controller 6. Conceptually, the rotor 1 is driven to rotate in much the same way as the rotor in a conventional stepper motor (although electrostatic forces are used in the motion sensor 10, whereas magnetostatic forces are used in a stepper motor). In one embodiment, the rotor 1 may be rotated at a rate of about 2000 radians/second, but the rotor 1 may be rotated at any suitable rate. The rotor 1 in this embodiment has eight recesses 11 arranged around the periphery of the rotor 1 that are separated by raised portions of the rotor 1. These recesses 11 are sized and shaped so that electrical fields generated by the drive electrodes 4 selectively attract and repel portions of the rotor 1 so that the rotor 1 is caused to rotate. Other arrangements for rotating the rotor 1 are possible, such as arranging one or more magnets on the rotor 1, and generating suitable magnetic fields to cause the rotor to rotate. Also, the rotor 1 may have any suitable number of recesses 11 and may be driven by any suitable number of drive electrodes 4. In addition, the recesses 11 may be replaced by portions that are raised above other parts of the rotor 1 surface.

The drive electrodes 4 can also be used by the controller 6 to detect the rotational speed of the rotor 1, e.g., by detecting changes in capacitance between one or more drive electrodes 4 and portions of the rotor 1. The recesses 11 and adjacent raised portions serve to change the distance between the rotor 1 and the drive electrodes 4, and thus result in a changing capacitance that can be detected by the drive electrodes 4 or other means and used to determine the rotor's speed. Of course, the rotor's rotational speed may be detected in other ways, such as by detecting a varying magnetic field as the rotor moves, e.g., where the rotor includes one or more magnetic elements, by optically detecting rotor movement, etc.

In an alternate embodiment, the functions of the drive electrodes 4 may be performed by the stator electrodes and/or the lateral electrodes. For example, it is possible to arrange and control the stator electrodes so that they drive the rotor to spin at a time of start up and/or during operation of the motion sensor. In this case, the drive electrodes 4 may be eliminated. Since the rotor(s) may be provided in an evacuated environment, and may not contact any portion of the reference structure or other support during operation, the rotor may spin at a constant rate for extended periods without requiring additional driving forces.

Equations 1-10 below detail the governing equations of motion for a motion sensor having two counter-rotating rotors 1, where Equations 1-5 relate to a first rotor, and Equations 6-10 relate to a second rotor. Using these equations, the angular rotation rates and linear and angular accelerations of the reference structure can be derived.

$$m\ddot{x} = \Sigma F_{X,1} \quad (1)$$

$$m\ddot{y} = \Sigma F_{Y,1} \quad (2)$$

$$m\ddot{z} = \Sigma F_{Z,1} \quad (3)$$

$$I_T \alpha_x - (I_T - I_P)\Omega \omega_y = \Sigma M_{X,1} \quad (4)$$

$$I_T \alpha_y - (I_P - I_T)\Omega \omega_x = \Sigma M_{Y,1} \quad (5)$$

$$m\ddot{x} = \Sigma F_{X,2} \quad (6)$$

$$m\ddot{y} = \Sigma F_{Y,2} \quad (7)$$

$$m\ddot{z} = \Sigma F_{Z,2} \quad (8)$$

$$I_T \alpha_x - (I_T - I_P)\Omega \omega_y = \Sigma M_{X,2} \quad (9)$$

$$I_T \alpha_y - (I_P - I_T)\Omega \omega_x = \Sigma M_{Y,2} \quad (10)$$

In the equations above, m is the mass of each rotor 1, $\Omega$ is the spin rate for the rotors 1 (the rotor spins are opposite in direction, but identical in magnitude in this example), $\omega x$ and $\omega y$ are the angular rotation rates of the reference structure about the x and y axes, respectively, $\alpha x$ and $\alpha y$ are the angular accelerations of the reference structure about the x and y axes, respectively, IP and IT are the polar mass moment of inertia and transverse mass moment of inertia of the rotors, respectively, $\ddot{x}$, $\ddot{y}$, and $\ddot{z}$ are the linear accelerations of the reference structure along the x, y and z axes, respectively, Fx1, Fy1, Fz1, Mx1, My1 and Mz1 are the control forces and moments applied to the first rotor, and Fx2, Fy2, Fz2, Mx2, My2 and Mz2 are the control forces and moments applied to the second rotor. Fx1 indicates a linear force exerted on the first rotor in the x-direction, Mx indicates a moment applied to the first rotor about the x-axis, Fx2 indicates a linear force exerted on the second rotor in the x-direction, and so on.

Equations 1-3 and 6-8 provide the linear accelerations of the reference structure, i.e., $\ddot{x}$, $\ddot{y}$, and $\ddot{z}$. The angular rotation rates of the reference structure about the x and y axes are derived by manipulation of Equations 4-5 and 9-10, and are given by Equations 11 and 12 below. Of course, the angular acceleration of the reference structure about the x and y axes may be determined, as well, if desired.

$$\omega_y = \frac{\sum M_{X,2} - \sum M_{X,1}}{2(I_T - I_P)\Omega} \quad (11)$$

$$\omega_x = \frac{\sum M_{Y,2} - \sum M_{Y,1}}{2(I_P - I_T)\Omega} \quad (12)$$

As will be appreciated by those of skill in the art, the angular rotation rate and angular acceleration of the reference structure about the z-axis can be determined directly by measurement using, for example, the drive electrodes 4 to detect changes in apparent rotational speed of the rotors 1.

The various control forces and moments applied to the first and second rotors, i.e., Fx1, Fy1, Fz1, Mx1, My1 and Mz1, and Fx2, Fy2, Fz2, Mx2, My2 and Mz2, are directly related to the electrostatic forces exerted by the electrodes in the stators 2T, 2B and/or the lateral electrodes 3 on the rotor 1. These forces and moments can be determined based on the electrical signals applied to the electrodes, e.g., based on the voltages applied to the electrodes.

The rotor 1, electrodes of the stators 2, and lateral electrodes 3 as well as the reference structure may be formed in any size and/or shape using any suitable technique. In one illustrative embodiment, the rotor 1 has a thickness of about 1 millimeter and a diameter of about 2.5 millimeters, with the electrodes of the stators 2T, 2B and the lateral electrodes 3 being sized accordingly. In such an embodiment, the various portions of the motion sensor 10 may be made using standard semiconductor chip manufacturing techniques, including photolithography, etching, doping, etc. The rotor 1 may be made of a conductive material or may be coated with a conductive material. For example, the rotor 1 may be made of silicon and have a plating of conductive material, e.g., gold, on its outer surface, or the rotor 1 may be made of silicon and doped so as to be conductive, at least on the exterior surface. The electrodes may be formed by depositing a conductive material, such as titanium-gold, on a substrate, such as a semiconductor or insulator, and patterning the conductive material to form the appropriate electrode shape(s). The spatial arrangement of the electrodes in the motion sensor 10 may impact the three-dimensional electric fields around the rotor 1, and thus optimization of the electrode design may minimize adverse effects, such as fringing, charge transport, etc. It should be understood, however, that the rotor 1 and other portions of the motion sensor 10 may be made in any suitable size and/or shape and/or material using any suitable manufacturing processes.

The reference structure that supports the electrodes, rotor and other portions of the motion sensor 10 may have any size and/or shape, and may provide a closed environment in which the rotor is housed. For example, the rotor may be housed in a closed chamber or cavity that is evacuated to provide a low pressure, or high-vacuum, environment for the rotor. Such an environment may protect the motion sensor from dirt or other contaminants, harmful gasses, or other environmental conditions.

The rotor may be made in such a way as to reduce its mass, while maximizing its moment of inertia. For example, the rotor may be made from two parts that are sandwiched together. Each of the two parts may be hollowed on one side, e.g., in a honeycomb fashion, and the hollowed portions may be mated and secured together face-to-face. Such an arrangement may provide a rotor with a hollow interior, reducing its mass, while maximizing its moment of inertia.

Those of skill in the art will appreciate that other arrangements for the motion sensor are possible. For example, in the illustrative embodiment described above, two counter-rotating rotors are located side-by-side. Alternately, the rotors could be "stacked," e.g., so that the rotors rotate about a colinear axis and are separated by a single, shared stator. That is, a stacked arrangement may include a total of three stators and two rotors, with one stator between the rotors being shared. Of course, a stacked arrangement may include or two independent stators positioned between the rotors, with one stator for each rotor.

In an alternate arrangement, the motion sensor 10 may have two or more rotors 1 that rotate about two or more orthogonal or other transverse axes, and use the combined results of detecting movement of the rotors to determine movement of the reference structure relative to two or more axes. For example, the motion sensor may have three rotors 1 that rotate about orthogonal axes, and the lateral electrodes 3 used with each of the rotors 1 may be formed by a single annular electrode that serves only to keep a corresponding rotor properly located in directions perpendicular to the rotor spin axis. Movement of each of the rotors 1 in directions along their respective axes of rotation may be used together to determine movement of the reference structure along each of the three axes. Other arrangements will occur to those of skill in the art.

Also, although the rotors in the illustrative embodiment are disc-shaped elements, the rotors and/or electrodes could have other configurations. For example, the lateral electrodes may be eliminated by forming the rotor to have a diamond-shaped cross-section or a spherical shape. The stator electrodes may be suitably shaped to work with the rotor so that the stator electrodes apply forces to urge the rotor in x, y and z directions, rather than only in the z direction in the embodiment shown in FIG. 1.

In the illustrative embodiment above, the electrodes of the stators 2T, 2B and the lateral electrodes 3 function as both sense and drive electrodes. That is, the controller 6 switches the operation of the electrodes 2T, 2B and 3 between sense operations (when the capacitance between the electrodes and the rotor is sensed) and drive operations (when an electrical signal is applied to the electrodes to urge the rotor in a particular direction). The sense and drive functions could be performed by the electrodes simultaneously, or additional electrodes may be provided so that certain electrodes are dedicated to sense functions, while other electrodes are dedicated to drive functions.

While the motion sensor 10 is in storage or otherwise not being used, the rotor 1 may be protected from damage by electrostatically pinning the rotor 1 to a surface in a cavity or space in the reference structure. The pinning charge may be periodically enhanced, based on the bleed rate of charge on rotor 1 to portions of the reference structure. During start up, if the rotor 1 is not charged, a charge may be injected onto the rotor 1, whereafter the rotor's position in the cavity may be controlled by the stator electrodes and the lateral electrodes. The rotor 1 may then be rotated about its spin axis by the drive electrodes 4 or other suitable means. The charge on the rotor 1 may be adjusted during operation of the motion sensor, as the charge on the rotor 1 may be important to detecting movement of the rotor, e.g., by changes in capacitance. Also, the scale factor of the motion sensor 10, i.e., a detection range and/or sensitivity of the sensor, may be directly proportional to the charge on the rotor 1. Thus, higher charge levels on the rotor 1 may enable the sensor 10 to detect a wider range of accelerations/velocities of the reference structure. The controller 6 may change the charge level on the rotor 1 during operation, e.g., increase the charge level on the rotor 1 in conditions where the controller 6 anticipates higher amplitude accelerations.

The controller 6 may include any suitable components for performing its various functions, including sensing movement of the rotor(s), electrically communicating with the electrodes, determining forces to exert on the rotor to rotate the rotor and/or move the rotor to a desired position, placing a suitable electrical charge on the rotor during start up or during operation, determining linear or rotational velocity and/or acceleration of the reference structure, outputting and inputting information with respect to external devices, etc. The controller 6 may include any suitable general purpose data processing system, which can be, or include, a suitably programmed general purpose computer, or network of general purpose computers, and other associated devices, including communication devices, and/or other circuitry or components necessary to perform the desired input/output or other functions. The controller 6 can also be implemented at least in part as single special purpose integrated circuits (e.g., ASICs), or an array of ASICs, each having a main or central processor section for overall, system-level control and separate sections dedicated to performing various different specific computations, functions and other processes under the control of the central processor section. The controller 6 can also be implemented using a plurality of separate dedicated programmable integrated or other electronic circuits or devices, e.g., hardwired electronic or logic circuits, such as discrete element circuits or programmable logic devices. The controller 6 may also include other devices, such as an information display device, user input devices, such as a keyboard, user pointing device, touch screen or other user interface, data storage devices, communication devices or other electronic circuitry or components. The controller 6 may send and/or receive signals in any suitable way, such as by wired and/or wireless link, and in any suitable format and/or communications protocol.

While aspects of the invention have been described with reference to various illustrative embodiments, the invention is not limited to the embodiments described. Thus, it is evident that many alternatives, modifications, and variations of the embodiments described will be apparent to those skilled in the art. Accordingly, embodiments of the invention as set forth herein are intended to be illustrative, not limiting. Various changes may be made without departing from the invention.

The invention claimed is:

1. A motion sensor comprising:
a reference structure;
a free-floating rotor constructed and arranged to rotate about an axis relative to the reference structure and to be free from contact with the reference structure;
a plurality of electrodes supported by the reference structure, the electrodes being positioned adjacent at least top, bottom and side surfaces of the free-floating rotor; and
circuitry that detects movement of the reference structure relative to the free-floating rotor, the circuitry positioning the free-floating rotor relative to the reference structure using a force-balanced control of at least one pair of the electrodes, the force-balanced control operating to determine control signals to be provided to each of the electrodes in the pair to exert forces on the free-floating rotor to keep the free-floating rotor in a desired position relative to the reference structure and without calculating displacement of the free-floating rotor relative to the reference structure.

2. The sensor of claim 1, wherein the circuitry detects linear or rotational movement of the reference structure relative to at least one axis based on detected movement of the reference structure relative to the free-floating rotor.

3. The sensor of claim 1, wherein the circuitry detects a speed of rotational movement of the reference structure about at least one axis based on detected movement of the reference structure relative to the free-floating rotor.

4. The sensor of claim 1, wherein the circuitry detects a linear or rotational acceleration of the reference structure relative to at least one axis based on detected movement of the reference structure relative to the free-floating rotor.

5. The sensor of claim 1, wherein the circuitry detects an acceleration of the reference structure relative to at least two orthogonal axes, and detects rotational movement of the reference structure about at least two orthogonal axes, based on detected movement of the reference structure relative to the free-floating rotor.

6. The sensor of claim 1, wherein the plurality of electrodes includes multiple pairs of electrodes.

7. The sensor of claim 6, wherein each pair of electrodes includes a first electrode positioned on a first side of the free-floating rotor and a second electrode on a second side of the free-floating rotor, and wherein the circuitry uses a force-balanced control for the multiple pairs of electrodes.

8. The sensor of claim 7, wherein the circuitry detects a position of the free-floating rotor relative to the reference structure based on a capacitance between the electrodes and the free-floating rotor.

9. The sensor of claim 8, wherein the circuitry applies control signals to the first and second electrodes of each pair of electrodes based on a capacitance between each pair of electrodes and the free-floating rotor, the control signals being suitable to move the free-floating rotor relative to the first and second electrodes.

10. The sensor of claim 9, wherein the control signals cause the electrodes to exert an electrostatic force on the free-floating rotor.

11. The sensor of claim 1, comprising at least two rotors that rotate in opposite directions about parallel axes relative to the reference structure, and wherein the circuitry exerts electrostatic forces via the plurality of electrodes on the free-floating rotors to maintain the free-floating rotors in a desired position relative to the reference structure.

12. The sensor of claim 11, wherein the circuitry determines an acceleration of the reference structure relative to the free-floating rotors based on the electrostatic forces exerted on the free-floating rotors.

13. The sensor of claim 11, wherein the circuitry determines the electrostatic forces based on a capacitance between at least one electrode and the free-floating rotors.

14. The sensor of claim 1, wherein the plurality of electrodes includes electrodes adjacent top, bottom and side surfaces of the free-floating rotor, and the circuitry applies electrostatic forces on the free-floating rotor to maintain the free-floating rotor in a desired position relative to the reference structure by applying suitable electrical signals to the electrodes.

15. The sensor of claim 14, wherein the circuitry determines an acceleration of the reference structure relative to the free-floating rotor based on the electrostatic forces exerted on the free-floating rotor.

16. The sensor of claim 15, wherein the circuitry determines the electrostatic forces based on a capacitance between the electrodes and the free-floating rotor.

17. The sensor of claim 1, wherein the circuitry injects a charge on the free-floating rotor.

18. The sensor of claim 17, wherein the circuitry controls the charge on the free-floating rotor using field emissions.

19. The sensor of claim 1, wherein the circuitry removes common mode effects on detected reference structure movement.

20. A motion sensor comprising: a reference structure;
at least one free-floating gyroscopic rotor arranged to rotate about an axis relative to the reference structure without physical contact with a support;
a plurality of electrodes supported by the reference structure, the electrodes being positioned adjacent at least top, bottom and side surfaces of the free-floating rotor and including at least three top stator electrodes positioned adjacent the top surface and at least three bottom stator electrodes positioned adjacent the bottom surface; and
a controller that detects movement of the free-floating gyroscopic rotor relative to the reference structure and that uses a force-balanced control to apply control signals to pairs of electrodes to position the free-floating rotor relative to the reference structure, each pair of electrodes including a top stator electrode and a bottom stator electrode, and the force-balanced control operating to determine control signals to be provided to each of the electrodes in each pair of electrodes to exert forces on the free-floating rotor to keep the free-floating rotor in a desired position relative to the reference structure and without calculating displacement of the free-floating rotor relative to the reference structure.

21. The motion sensor of claim 20, wherein the controller determines an acceleration of the reference structure relative to the gyroscopic rotor.

22. The motion sensor of claim 20, wherein the controller applies at least one force to the gyroscopic rotor to urge the gyroscopic rotor to a desired position relative to the reference structure and detects movement of the reference structure relative to the gyroscopic rotor based on the at least one force applied to the gyroscopic rotor.

23. The motion sensor of claim 20, wherein the controller detects movement of the reference structure relative to the gyroscopic rotor based on a capacitance between the gyroscopic rotor and at least one of the pairs of electrodes.

24. The motion sensor of claim 20, wherein the controller determines an acceleration of the reference structure relative to at least two orthogonal axes.

25. The motion sensor of claim 20, wherein the controller determines an angular velocity of the reference structure about at least one axis.

26. The motion sensor of claim 20, wherein the controller determines an acceleration of the reference structure relative to at least one axis, and determines an angular velocity of the reference structure about at least one axis.

27. The motion sensor of claim 20, wherein the controller determines an acceleration of the reference structure relative to three orthogonal axes, and determines an angular velocity of the reference structure about at least two orthogonal axes.

28. The motion sensor of claim 20, comprising first and second gyroscopic rotors that rotate about the axis in opposite directions, and wherein the controller detects movement of the first and second gyroscopic rotors relative to the reference structure.

29. The motion sensor of claim 20, comprising a set of lateral electrodes positioned around a periphery of the gyroscopic rotor.

30. The motion sensor of claim 29, wherein the controller applies control signals to the lateral electrodes to maintain the rotor in a desired position relative to the reference structure.

31. The motion sensor of claim 30, wherein the controller determines the control signals based on at least one capacitance between at least one of the pairs of electrodes, and at least one capacitance between the lateral electrodes and the gyroscopic rotor.

32. The motion sensor of claim 30, wherein the set of lateral electrodes includes at least four lateral electrodes.

33. The motion sensor of claim 29, further comprising a set of drive electrodes that drive the gyroscopic rotor to rotate about the axis.

34. The motion sensor of claim 33, wherein the gyroscopic rotor includes a plurality of depressions and adjacent raised surfaces that interact with the set of drive electrodes.

35. The motion sensor of claim 20, wherein the gyroscopic rotor includes a hollow or honeycombed interior.

36. The motion sensor of claim 35, wherein the gyroscopic rotor is made of two parts including hollowed sections that are mated together.

37. The motion sensor of claim 20, wherein the gyroscopic rotor is a disc-like member with an electrically conductive exterior.

38. The motion sensor of claim 20, wherein the control signals from the controller causes the electrodes to apply electrostatic forces to the gyroscopic rotor to urge the gyroscopic rotor to a desired position relative to the reference structure.

39. A method of sensing movement of a device, comprising:

rotating a free-floating body relative to a reference structure, the free-floating body being free from contact with any physical support;

exerting control forces on the free-floating body by applying control signals to a plurality of electrodes mounted to the reference structure, the control forces being determined using a force-balanced control that operates to achieve a predetermined balance between forces exerted by each one in at least one pair of electrodes to keep the free-floating body in a desired position relative to the reference structure, the force-balanced control operating to determine the control signals to be provided to the electrodes without calculating displacement of the free-floating body relative to the reference structure;

detecting movement of the free-floating body relative to the reference structure based on control forces applied to the free-floating body; and determining an acceleration of the reference structure based on the detected movement of the free-floating body relative to the reference structure.

40. The method of claim 39, wherein the step of exerting control forces comprises detecting a change in capacitance between the free-floating body and at least a portion of the reference structure.

41. The method of claim 39, wherein the step of determining an acceleration comprises determining an acceleration of the reference structure along at least two orthogonal axes.

42. The method of claim 39, wherein the step of determining an acceleration comprises determining an acceleration of the reference structure along three orthogonal axes.

* * * * *